United States Patent [19]

Son

[11] Patent Number: 5,146,495

[45] Date of Patent: Sep. 8, 1992

[54] CIRCUIT AND METHOD FOR MAINTAINING SECURITY OF VIDEO TAPE USING PRIVACY NUMBER

[75] Inventor: Young T. Son, Kyungki, Rep. of Korea

[73] Assignee: Gold Star Co., Ltd., Seoul, Rep. of Korea

[21] Appl. No.: 776,436

[22] Filed: Oct. 18, 1991

[51] Int. Cl.$^5$ ............................................. H04N 7/167
[52] U.S. Cl. .......................................... 380/5; 380/3; 380/23
[58] Field of Search ................................. 380/5, 3, 23

[56] References Cited

U.S. PATENT DOCUMENTS

| | | | |
|---|---|---|---|
| 4,930,158 | 5/1990 | Vogel | 380/5 |
| 4,945,563 | 7/1990 | Horton et al. | 380/5 |
| 5,040,210 | 8/1991 | Anderson | 380/5 |
| 5,054,064 | 10/1991 | Walker et al. | 380/5 |

*Primary Examiner*—Thomas H. Tarcza
*Assistant Examiner*—David Cain
*Attorney, Agent, or Firm*—Finnegan, Henderson, Farabow, Garrett and Dunner

[57] ABSTRACT

A circuit for maintaining security of a video tape using a privacy number, including a sensing circuit for sensing lead tape portions of the video tape and producing a desired signal in accordance with the sensed result, a microcomputer for producing a desired control signal in response to the sensed signal from the sensing circuit and producing a switching signal and a display signal when the privacy number is applied, a control circuit for controlling the operation of the sensing circuit in response to the switching signal from the microcomputer, a deck for being driven in accordance with the control signal from the microcomputer, and a display unit for displaying a desired character in accordance with the display signal from the microcomputer. A method of maintaining security of the video tape is provided using the privacy number. According to the disclosed circuit and method, for the video tape to be secured, the lead tape portion of the video tape is exposed to an infrared-ray from an infrared-ray emitting diode preventing unauthorized persons from playing back contents that the user has recorded on the magnetic video tape in the video cassette recorder.

13 Claims, 4 Drawing Sheets

CIRCUIT AND METHOD FOR MAINTAINING SECURITY OF VIDEO TAPE USING PRIVACY NUMBER

BACKGROUND OF THE INVENTION

1. Field of the Invention

The present invention relates in general to a video cassette recorder, and more particularly to a circuit and method for maintaining security of a magnetic video tape using a privacy number to prevent others (unauthorized persons) from playing back contents that the user has recorded on the magnetic video tape in a video cassette recorder.

2. Description of the Prior Art

In a video cassette recorder, hereinafter referred to as a VCR, there has been provided an operation of rewinding a magnetic tape toward a first portion of the tape at a high speed when either the playback has been completed up to a last portion of the tape or the playback beginning at the first portion of the magnetic tape is desired by the user.

With reference to FIG. 1, a construction of a conventional video tape is shown. As shown in FIG. 1, the conventional video tape or magnetic tape has first and last portions A and B, respectively, and extending between reels RA and RB. The first and last portions are formed of transparent tape, on which video signals are not recorded. These lead tape portions A and B of the magnetic tape are transparent such that infrared-rays are passed therethrough. The magnetic tape illustrated in FIG. 1 also has a hatched portion corresponding to the portion on which the video signal is recorded.

In FIG. 2, a circuit diagram of a conventional sensing circuit in the VCR is shown. This conventional sensing circuit 100 is provided near the reels RA and RB for winding the magnetic tape, as shown in FIG. 1. As shown in FIG. 2, the sensing circuit 100 comprises an infrared-ray emitting diode IRD which is driven upon being applied with a predetermined power B+, and supply and take-up sensors 10 and 20, respectively. The supply sensor 10 and take-up sensor 20 each receive an infrared-ray from the infrared-ray emitting diode IRD through the lead tape portions A and B of the magnetic tape.

With the above-mentioned construction, when the VCR initiates its play operation and the lead tape portion A of the magnetic tape approaches near the reel RB, phototransistors Q1 and Q2 of the take-up sensor 20 receive the infrared-ray from the infrared-ray emitting diode IRD and apply a desired signal to a microcomputer 30. Upon receiving the desired signal from the take-up sensor 20, i.e., upon perceiving from the take-up sensor 20 that the lead tape portion A has been positioned near the reel RB, the microcomputer 30 controls a deck (not shown) to perform the operation in a rewind mode to rewind the video tape around the reel RA at high speed. When the lead tape portion B is positioned near the reel RA as a result of the above rewind mode operation, phototransistors Q3 and Q4 of the supply sensor 10 receive the infrared-ray from the infrared-ray emitting diode IRD and apply a desired signal to the microcomputer 30. Upon receiving the desired signal from the supply sensor 10, the microcomputer 30 recognizes that the lead tape portion B has been positioned near the reel RA and controls the deck to complete the rewind mode operation.

At this time, if the operation of the VCR is initiated from the position of the magnetic tape where the infrared-ray from the infrared-ray emitting diode IRD is transmitted through the lead tape portion B, the microcomputer 30 performs an eject operation in response to the sensed signal from the supply sensor 10. That is, the VCR cannot perform the operation in either a play mode or a fast-forward mode.

For this reason, the microcomputer 30, upon sensing that the lead tape portion B has been positioned near the reel RA as a result of the rewind mode operation, completes the operation in the rewind mode. Then, the microcomputer 30 changes the mode of operation from the rewind mode to the fast-forward mode to wind the video tape around the reel RB by a predetermined number of times, so that the lead tape portion B is not exposed to the infrared-ray emitting diode IRD.

However, the conventional VCR has a disadvantage, in that, everyone having access to the video tape can play back video and audio signals recorded on the video tape. Therefore, everyone is capable of playing back even the contents on the video tape held restricted by the user. As a result, for the purpose of maintaining security of the contents of the video tape, the video tape must be kept in an inaccessible place, creating an inconvenience.

SUMMARY OF THE INVENTION

The present invention has been made in view of the above circumstances, and it is an object of the present invention to provide a circuit for maintaining security of a video tape using a privacy number to prevent unauthorized persons from playing back contents of recorded material on the video tape in a video cassette recorder.

Another object of the present invention is to control an operation of an infrared-ray emitting diode to rewind the video tape, as far as the lead tape portion, at high speed to maintain the security of the video tape.

It is another object of the present invention to provide a circuit for maintaining security of a video tape using a privacy number, capable of stopping an operation of an infrared-ray emitting diode when the video tape has been rewound as far as a lead tape portion and then performing an operation in another mode, such as a play mode, so that secured contents on the video tape can be played back if it is desired by the user.

It is another object of the present invention to control an operation of an infrared-ray emitting diode to restrict the play back of recorded materials on video tape to only authorized persons by using a privacy number.

It is still another object of the present invention to provide a method of maintaining security of a video tape using a privacy number to prevent unauthorized persons from playing back contents of a recorded material on the video tape in a video cassette recorder.

In accordance with one aspect of the present invention, a circuit is provided for maintaining security of a video tape using a privacy number, comprising: sensing means for sensing lead tape portions of the video tape and for producing a sensed lead signal upon sensing the lead tape portions; a microcomputer for producing a desired control signal in response to the sensed lead signal from the sensing means; means for applying the privacy number to the microcomputer, the microcomputer producing a switching signal and a display signal when the privacy number is applied; control means connected to the microcomputer for controlling the operation of the sensing means in response to the switching signal received from the microcomputer; a deck connected to the microcomputer for being driven in accordance with the desired control signal produced by the microcomputer; and display means for displaying a desired character sign in accordance with the display signal received from the microcomputer.

In accordance with another aspect of the present invention, in a video cassette recorder having sensing means for sensing lead tape portions of the video tape, a microcomputer, means for applying the privacy number, control means for controlling the sensing means, display means for displaying a desired character sign, and a deck, comprising the steps of: applying the privacy number to the microcomputer, changing a mode of operation to a privacy mode when the privacy number has been applied, and then driving the displaying means; controlling the control means to stop the operation of the sensing means when the mode of operation is in the privacy mode, performing an eject mode operation, and then releasing the operation in the privacy mode; determining whether the privacy number has been applied to the microcomputer before the video tape is inserted into the video cassette recorder, controlling the deck to perform the eject mode operation when a lead tape portion of the video tape is sensed by the sensing means when no privacy number has been applied, and then driving the displaying means; and changing the mode of operation to the privacy mode when the privacy number has been applied when the video tape is inserted into the video cassette recorder, controlling the control means to stop the operation of the sensing means, driving the displaying means, and then releasing the operation in the privacy mode after the operation is performed in one of a play mode and a fast-forward mode.

BRIEF DESCRIPTION OF THE DRAWINGS

The above and other objects, features and advantages of the present invention will be more clearly understood from the following detailed description taken in conjunction with the accompanying drawings, in which:

FIG. 4 is a flowchart illustrating a security setting process for preventing unauthorized persons from playing back contents that have been recorded on the video tape, using the privacy number, in accordance with the present invention; and FIG. 5 is a flowchart illustrating a security process for preventing unauthorized persons from playing back the secured contents on the video tape, and a security releasing process, in accordance with the present invention.

DETAILED DESCRIPTION OF PREFERRED EMBODIMENTS

Figure 1:
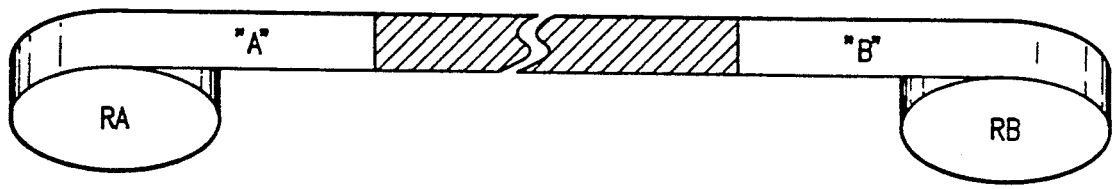
FIG. 1 illustrates a construction of a conventional video tape.

Reference will now be made to the presently preferred apparatus embodying the invention as illustrated in the accompanying drawings, in which like reference characters designate like or corresponding parts throughout the drawings.

First, a construction of a circuit for maintaining security of a video tape using a privacy number in accordance with the present invention will be described with reference to FIG. 3.

Figure 3:
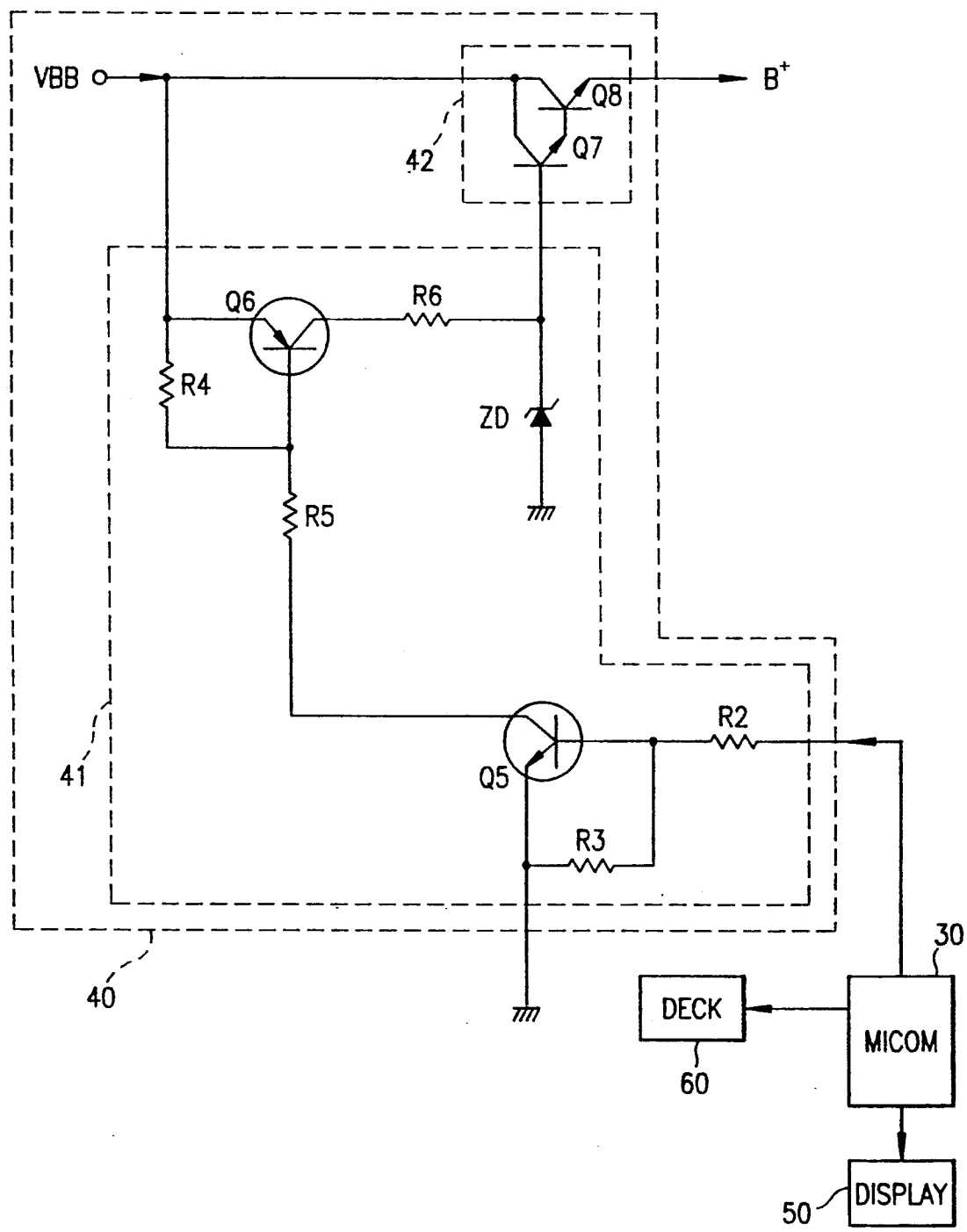
FIG. 3 is a circuit diagram of a circuit for maintaining security of a video tape using a privacy number in accordance with the present invention.

In FIG. 3, a circuit diagram of the circuit for maintaining security of the video tape using the privacy number is shown in accordance with the present invention. As shown in this drawing, the circuit of the present invention comprises a microcomputer 30, a control circuit 40, a display unit 50, and a deck 60.

The microcomputer 30, upon receiving a desired privacy number from a remote controller or a key matrix, not shown, drives the display unit 50 and changes the mode of operation to a privacy mode. In the privacy mode, when the deck 60 performs the rewind mode operation, the microcomputer 30 applies a switching signal to the control circuit 40.

When the operation is not in the privacy mode, the microcomputer 30 controls the deck 60 in a similar manner as that of the prior art. However, if the operation is in the privacy mode and if the deck 60 initiates an eject or a play operation under the privacy mode, the microcomputer 30 releases the privacy mode.

The control circuit 40 functions to control the operation of a conventional sensing circuit 100 (FIG. 1) under the control of microcomputer 30. For the purpose of performing the above function, the control circuit 40 comprises a switching section 41 and a control section 42.

The switching section 41 of the control circuit 40 is provided with an NPN-type switching transistor Q5 including a base for receiving the switching signal from the microcomputer 30. Transistor Q5 is driven in response to the switching signal from the microcomputer 30. A PNP-type switching transistor Q6 is provided including a base connected to the collector of the switching transistor Q5, so that switching transistor Q6 is driven in response to the driving of the switching transistor Q5. The reference numeral ZD designates a reverse current preventing zener diode.

The control section 42 of the control circuit 40 is provided with a Darlington circuit comprised of a pair of NPN-type switching transistors Q7 and Q8. The bases of transistors Q7 and Q8 are connected respectively to the collector of the switching transistor Q6 in the switching section 41 and to the emitter of the switching transistor Q7. Transistors Q7 and Q8 are driven in response to the driving of the switching transistor Q6 in the switching section 41 to control the supply of power B+ to the sensing circuit 100 (FIG. 1). Therefore, the control section 42 of the control circuit 40 functions to apply the power B+ to a conventional infrared-ray emitting diode IRD in the sensing circuit 100 in accordance with the switching transistors Q7 and Q8 which are driven in response to the driving of the switching transistor Q6 in the switching section 41.

The display unit 50 functions to display a desired character sign under the control of the microcomputer 30. For example, the display unit 50 may include a light emitting diode display, a liquid crystal display, etc. The display unit 50 may be omitted if desired in the preferred embodiment of the present invention. If the display unit 50 is omitted, the microcomputer 30 need not include a function of outputting a display signal.

The deck 60 is driven under the control of the microcomputer 30 in a similar manner as that of the prior art.

Next, a method of maintaining security of a video tape using the privacy number in accordance with the present invention will be described with reference to FIGS. 4 and 5.

Figure 4:
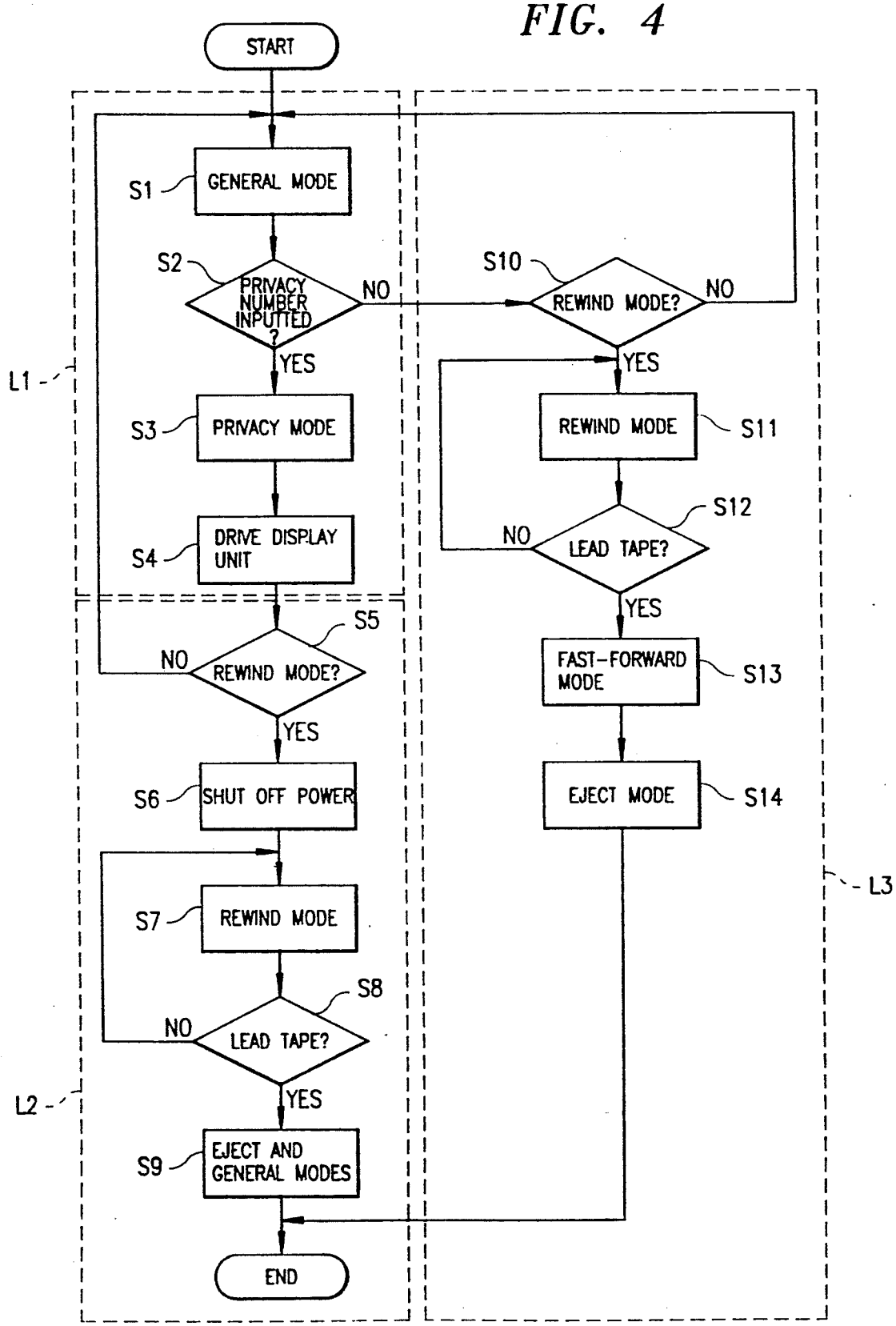
FIGS. 4 and 5 are flowcharts illustrating a method of maintaining security of a video tape using a privacy number in accordance with the present invention.
Figure 5:
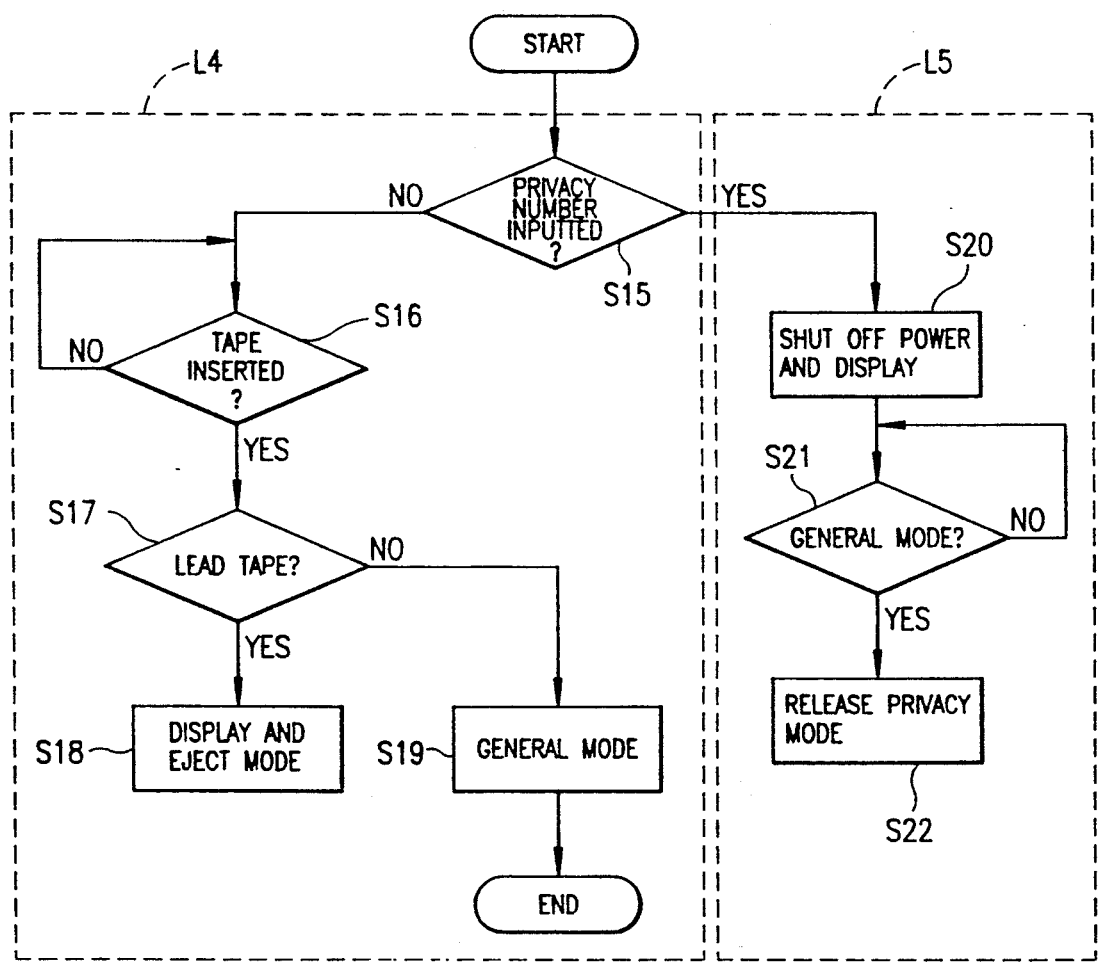

In FIGS. 4 and 5, flowcharts illustrating the method of maintaining security of the video tape are shown using the privacy number in accordance with the present invention FIG. 4 is a flowchart illustrating a security setting process for preventing unauthorized persons from playing back contents that the user has recorded on the video tape, using the privacy number, in accordance with the present invention. FIG. 5 is a flowchart illustrating a security process for preventing unauthorized persons from playing back the secured contents on the video tape, and a security releasing process, in accordance with the present invention.

Referring to FIG. 4, the security setting process in accordance with the present invention comprises the steps of (L1) changing the mode of operation to the privacy mode to maintain the security of the contents that the user has recorded on the video tape, (L2) preventing unauthorized persons from playing back the contents recorded on the video tape based on the privacy mode, and (L3) performing a general function if no privacy number has been inputted.

Step (L1) includes the steps of (S1) performing a general function in the VCR, (S2) determining whether the privacy number has been inputted, (S3) changing the operation mode to the privacy mode when the privacy number has been inputted, and (S4) displaying a desired character sign through the display unit 50 under the privacy mode.

Step (L2) includes the steps of (S5) determining whether the operation mode is in the rewind mode, (S6) shutting off the power being supplied to the infrared-ray emitting diode IRD if the operation is in the rewind mode, (S7) performing the operation in the rewind mode, (S8) completing the operation in the rewind mode, and (S9) performing the operation in the eject mode, therefore releasing the operation in the privacy mode and returning the operation to a general mode when the operation in the rewind mode has been completed.

Step (L3) includes the steps of (S10) determining whether the operation is in the rewind mode if it is determined in step (S2) that the privacy number has not been inputted, (S11) performing the operation in the rewind mode, (S12) sensing by means of supply and take-up sensors 10 and 20 in the sensing circuit 100 the lead tape portion of the video tape as a result of the rewind mode operation, (S13) performing the operation in the fast-forward mode when the lead tape portion is sensed, and (S14) performing the operation in the eject mode.

Referring to FIG. 5, the security process in accordance with the present invention comprises the step of (L4) preventing unauthorized persons from playing back the secured contents on the video tape. Also, the security releasing process in accordance with the present invention comprises the step of (L5) releasing the secured state of the video tape.

Step (L4) includes the steps of (S15) determining whether the privacy number has been inputted, (S16) determining whether the video tape has been inserted if no privacy number has been inputted, (S17) determining whether the lead tape portion has been exposed if the video tape has been inserted, (S18) performing the operation in the eject mode and displaying a desired character sign through the display unit 50, if the lead tape portion has been exposed, and (S19) performing a general operation such as play mode operation, fast-forward mode operation, etc. under a control of the user if the lead tape portion has not been exposed.

Step (L5) includes the steps of (S20) changing the operation mode to the privacy mode, shutting off the power being supplied to the infrared-ray emitting diode IRD and driving the display unit 50, if it is determined in step (S15) that the privacy number has been inputted, (S21) determining whether the operation is being performed in a general mode under a control of the user, and (S22) releasing the operation in the privacy mode if the operation is being performed in a general mode.

Now, the operation of the circuit for maintaining security of the video tape using the privacy number in accordance with the present invention will be described in detail with reference to FIGS. 4 and 5.

First, with reference to FIG. 4, in the VCR, the deck 60 performs a general function required by the user under the control of the microcomputer 30 at step (S1). At this time, if the user wants to maintain the security of the contents on the video tape, a desired privacy number is applied to the microcomputer 30 using the remote controller or key matrix (not shown). Then, the microcomputer 30 determines whether the privacy number has been inputted at step (S2). If the correct privacy number has been inputted, the microcomputer 30 sets a privacy mode flag in an internal RAM to change the operation mode to the privacy mode at step (S3).

A method of discriminating whether the inputted privacy number is correct is disclosed in published Korean Patent Application Nos. 87-14749 and 87-15449, the contents of which are incorporated herein by reference.

If the operation mode is changed to the privacy mode, the microcomputer 30 controls the display unit 50 to display a desired character sign indicating that the privacy number has been inputted, for example, "PRIVACY" at step (S4).

It is noted that the above step (S4) may be omitted if the display unit 50 is not desired to be included in the preferred embodiment of the present invention.

Then, the microcomputer 30 determines whether the operation mode is in the rewind mode under the control of the remote controller by the user, for example, or whether the video tape has been forwarded up to the last portion, i.e., the lead tape portion A is sensed and thus the operation mode must be changed automatically to the rewind mode, at step (S5). If the operation mode is changed to the rewind mode, the microcomputer 30 outputs a low level switching signal to the switching transistor Q5 (FIG. 3) at step (S6).

Figure 2:
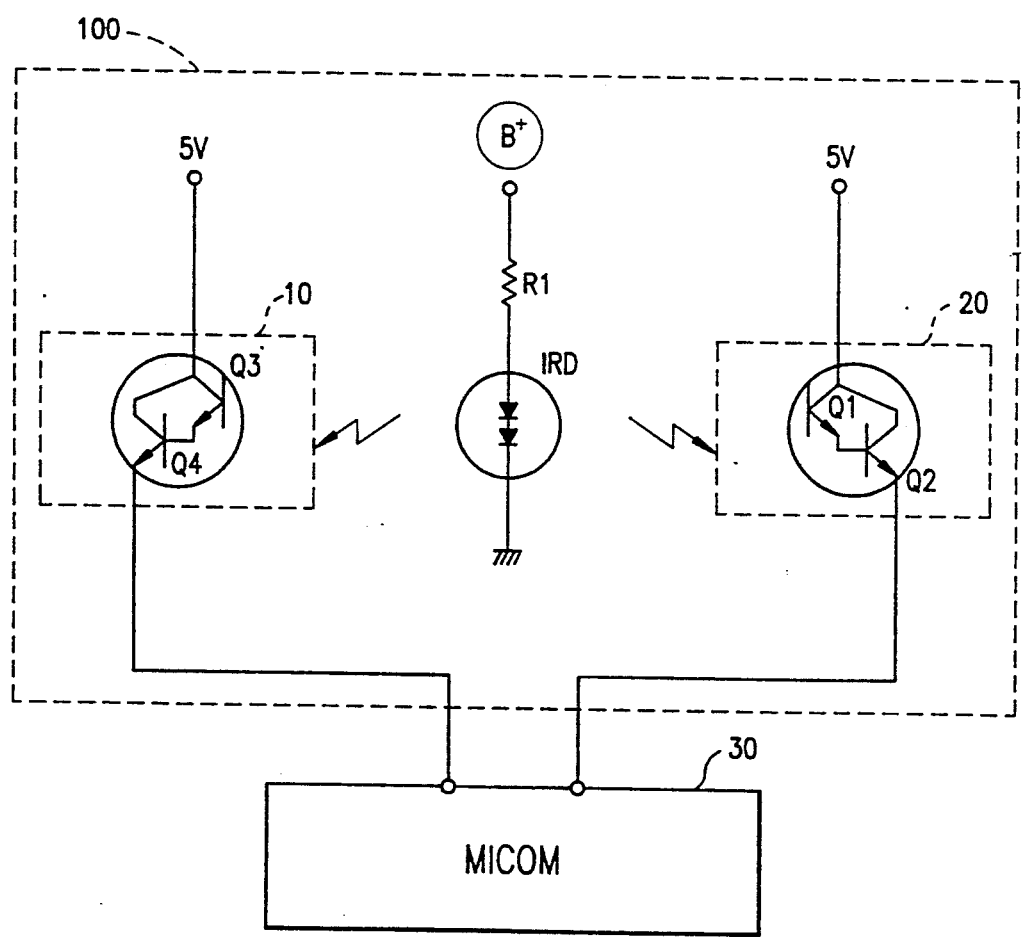
FIG. 2 is a circuit diagram of a conventional sensing circuit incorporated in a video cassette recorder.

The low level switching signal disables the switching transistor Q5, thereby increasing the potential at the base of the switching transistor Q6. As a result, the switching transistor Q6 is also disabled. Disabling the switching transistor Q6 also disables switching transistors Q7 and Q8. Therefore, in this case, no power is applied to the infrared-ray emitting diode IRD shown in FIG. 2 and the operation of the infrared-ray emitting diode IRD is disabled.

At this time, if the operation is not under the privacy mode but under the general mode, the microcomputer 30 applies a high level switching signal to the switching transistor Q5, thereby enabling switching transistors Q5, Q6, Q7 and Q8. As a result, the infrared-ray emitting diode IRD is applied with the power B+.

After the infrared-ray emitting diode IRD is disabled in step (S6), the microcomputer 30 performs the operation in the rewind mode to rewind the video tape at step (S7). At this time, since there is no emission from the infrared-ray emitting diode IRD, the microcomputer 30 cannot sense the lead tape portion of the video tape. As a result, the microcomputer 30 determines whether the video tape has been rewound up to the last portion or the lead tape portion at step (S8) through a different means.

The determination at step (S8) is accomplished, for example, based on rotations of the reels RA and RB. That is, the microcomputer 30 completes the operation in the rewind mode if no rotation of the reels is present during a predetermined period of time. This means that the video tape has been rewound up to the last portion or the lead tape portion.

Then, at step (S9), the microcomputer 30 performs the operation in the eject mode in which the video tape is ejected out of the VCR, and resets the privacy mode flag to release the privacy mode.

Step (L3) performs the operation in the rewind mode similar to the prior art when no privacy number has been inputted At step (S10), it is determined whether the operation is in the rewind mode when it is first determined in step (S2) that the privacy number has not been inputted, and at step (S11), the operation is performed in the rewind mode. At this time, since there is no privacy number being inputted, the infrared-ray emitting diode IRD is driven with the power B+, to emit the infrared-ray. As a result, the microcomputer 30 at step (S12) is able to sense the lead tape portion of the video tape by means of the supply and take-up sensors 10 and 20 in the sensing circuit 100, performs at step (S13) the operation in the fast-forward mode to wind the video tape by a predetermined number of times when the lead tape portion is sensed, and performs at step (S14) the operation in the eject mode.

It is noted that there is a difference between the rewind mode operation under the privacy mode and that of the modes other than the privacy mode. Namely, under the privacy mode, the rewind mode operation is stopped when the lead tape portion is exposed. However, in modes other than the privacy mode, the operation is performed in the fast-forward mode which winds the tape forward by a predetermined number of times so that the lead tape portion is not exposed.

With reference to FIG. 5, the microcomputer 30 at step (S15) determines whether the privacy number has been inputted, and determines at step (S16) whether the video tape has been inserted if no privacy number has been inputted. Then, the microcomputer 30 at step (S17) determines, by means of the supply and take-up sensors 10 and 20, whether the lead tape portion has been exposed if the video tape has been inserted If the lead tape portion has been exposed, the operation is performed in the eject mode and the display unit 50 displays a desired character sign indicating the secured tape at step (S18). On the other hand, if the lead tape portion has not been exposed, i.e., if the lead tape portion is not sensed, the microcomputer 30 at step (S19) performs a general operation such as play mode operation, fast-forward mode operation, etc., under the control of the user.

It is noted that step (S15) and the operation of the display unit 50 is present only in the VCR of the preferred embodiment in accordance with the present invention. These features are not present in the conventional VCR.

In accordance with the present invention, for the purpose of playing back contents on the video tape in which the lead tape portion has been exposed to the infrared-ray from the infrared-ray emitting diode IRD, the user applies the privacy number to the microcomputer 30 in the VCR of the present invention by means of the remote controller or key matrix.

In other words, if it is determined in step (S15) that the privacy number has been inputted, the microcomputer 30 at step (S20) changes the operation to the privacy mode, applies a desired switching signal to the control circuit 40 to shut off the power B+ being supplied to the infrared-ray emitting diode IRD, and controls the display unit 50 to display a desired character sign indicating the privacy mode. As a result, since the emission from the infrared-ray emitting diode IRD is stopped, the microcomputer 30 cannot recognize the exposure of the lead tape portion For this reason, although the video tape in which the lead tape portion has been exposed is inserted into the VCR, the eject mode operation as carried in a conventional VCR will not take place.

Under the condition that the video tape has been inserted into the VCR, the microcomputer 30 at step (S21) determines whether the operation is performed in a general mode such as the play mode or fast-forward mode under the control of the user. If the operation is performed in the general mode, the operation in the privacy mode is released at step (S22).

As a result, the operation of the VCR is performed in the play mode or fast-forward mode. Then the operation is performed in the rewind mode after the video tape has wound around the reel RB to allow the take-up reel 20 to sense the lead tape portion A of the video tape.

As hereinbefore described, in accordance with the present invention, circuit and method for maintaining the security of a video tape are provided using a privacy number. The circuit and method prevent unauthorized persons from playing back the contents that the user has recorded on the magnetic video tape in the video cassette recorder. According to the circuit and method of the present invention, for the video tape to be secured, the operation of the infrared-ray emitting diode is disabled by the privacy number. Therefore, unauthorized persons are prevented from playing back the contents that the user has recorded on the magnetic video tape in the video cassette recorder when the lead tape portion of the video tape is exposed to the infrared-ray from the infrared-ray emitting diode. Also, for the video tape in which the lead tape portion has been exposed, the operation of the infrared-ray emitting diode is disabled by the privacy number, thereby allowing the user to playback the secured content on the video tape if desired.

The foregoing description of preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A circuit for maintaining security of a video tape using a privacy number, comprising:
   sensing means for sensing lead tape portions of the video tape and for producing a sensed lead signal upon sensing the lead tape portions;
   a microcomputer for producing a desired control signal in response to the sensed lead signal from said sensing means;
   means for applying the privacy number to said microcomputer, said microcomputer producing a switching signal when the privacy number is applied;
   control means connected to said microcomputer for controlling the operation of said sensing means in response to the switching signal received from said microcomputer; and
   a deck connected to said microcomputer for being driven in accordance with the desired control signal produced by said microcomputer.

2. A circuit for maintaining security of a video tape using a privacy number according to claim 1, wherein said control means includes:
   a switching section connected to said microcomputer, said switching section being driven in response to the switching signal from said microcomputer; and
   a control section connected to said switching section, said control section being driven in response to the driving of said switching section to control a supply of power to said sensing means.

3. A circuit for maintaining security of a video tape using a privacy number according to claim 2, wherein said switching section comprises:
   a first switching transistor including a base for receiving the switching signal from said microcomputer, said first switching transistor being driven in response to the switching signal from said microcomputer; and
   a second switching transistor including a base coupled to a collector of said first switching transistor, said second switching transistor being driven in response to the driving of said first switching transistor.

4. A circuit for maintaining security of a video tape using a privacy number according to claim 3, wherein said control section comprises:
   a Darlington circuit including third and fourth switching transistors, said third switching transistor having a base coupled to the collector of said second switching transistor in said switching section and said fourth switching transistor having a base coupled to the emitter of said third switching transistor, said Darlington circuit being driven in response to the driving of said second switching transistor in said switching section to control supplying of the power to said sensing means.

5. A circuit for maintaining security of a video tape using a privacy number, comprising:
   sensing means for sensing lead tape portions of the video tape and for producing a sensed lead signal upon sensing the lead tape portions;
   a microcomputer for producing a desired control signal in response to the sensed lead signal from said sensing means;
   means for applying the privacy number to said microcomputer, said microcomputer producing a switching signal and a display signal when the privacy number is applied;
   control means connected to said microcomputer for controlling the operation of said sensing means in response to the switching signal received from said microcomputer;
   a deck connected to said microcomputer for being driven in accordance with the desired control signal produced by said microcomputer; and
   display means for displaying a desired character sign in accordance with the display signal received from said microcomputer.

6. A circuit for maintaining security of a video tape using a privacy number according to claim 5, wherein said control means includes:
   a switching section connected to said microcomputer, said switching section being driven in response to the switching signal from said microcomputer; and
   a control section connected to said switching section, said control section being driven in response to the driving of said switching section to control a supply of power to said sensing means.

7. A circuit for maintaining security of a video tape using a privacy number according to claim 6, wherein said switching section comprises:
   a first switching transistor including a base for receiving the switching signal from said microcomputer, said first switching transistor being driven in response to the switching signal from said microcomputer; and
   a second switching transistor including a base coupled to a collector of said first switching transistor, said second switching transistor being driven in response to the driving of said first switching transistor.

8. A circuit for maintaining security of a video tape using a privacy number according to claim 7, wherein said control section comprises:
   a Darlington circuit including third and fourth switching transistors, said third switching transistor having a base coupled to the collector of said second switching transistor in said switching section and said fourth switching transistor having a base coupled to the emitter of said third switching transistor, said Darlington circuit being driven in response to the driving of said second switching transistor in said switching section to control supplying of the power to said sensing means.

9. A method of maintaining security of a video tape using a privacy number in a video cassette recorder having sensing means for sensing lead tape portions of the video tape, a microcomputer, means for applying the privacy number, control means for controlling said sensing means, and a deck, comprising the steps of:
   applying the privacy number to said microcomputer, and changing a mode of operation to a privacy mode when the privacy number has been applied;
   controlling said control means to stop the operation of said sensing means when the mode of operation is in the privacy mode, performing an eject mode operation, and then releasing the privacy mode;

determining whether the privacy number has been applied to said microcomputer before the video tape is inserted into the video cassette recorder, and controlling said deck to perform the eject mode operation when a lead tape portion of the video tape is sensed by said sensing means when no privacy number has been applied; and changing the mode of operation to the privacy mode when the privacy number has been applied when the video tape is inserted into the video cassette recorder, controlling said control means to stop the operation of said sensing means, and then releasing the privacy mode after one of a play mode operation and a fast-forward mode operation is performed.

10. A method of maintaining security of a video tape using a privacy number in a video cassette recorder according to claim 9, wherein the video cassette recorder further includes display means for displaying a desired character sign, and wherein the method further comprises the step of driving said displaying means after the step of changing a mode of operation to a privacy mode when the privacy number has been applied.

11. A method of maintaining security of a video tape using a privacy number in a video cassette recorder according to claim 9, wherein the video cassette recorder further includes display means for displaying a desired character sign, and wherein the method further comprises the step of driving said displaying means after the step of controlling the deck to perform the eject mode operation when the lead tape portion of the video tape is sensed by the sensing means when no privacy number has been applied.

12. A method of maintaining security of a video tape using a privacy number in a video cassette recorder according to claim 9, wherein the video cassette recorder further includes display means for displaying a desired character sign, and wherein the method further comprises the step of driving said displaying means after the step of controlling the control means to stop the operation of the sensing means.

13. A method of maintaining security of a video tape using a privacy number in a video a cassette according to claim 9, wherein the video cassette recorder further includes display means for displaying a desired character sign, and wherein:

the method further comprises the step of driving said displaying means after the step of changing a mode of operation to a privacy mode when the privacy number has been applied;

the method further comprises the step of driving said displaying means after the step of controlling the deck to perform the eject mode operation when the lead tape portion of the video tape is sensed by the sensing means when no privacy number has been applied; and the method further comprises the step of driving said displaying means after the step of controlling the control means to stop the operation of the sensing means.

* * * * *

UNITED STATES PATENT AND TRADEMARK OFFICE
CERTIFICATE OF CORRECTION

PATENT NO. : 5,146,495
DATED : September 08, 1992
INVENTOR(S) : Young Tai SON It is certified that error appears in the above-identified patent and that said Letters Patent is hereby corrected as shown below:

Claim 13, column 12, line 13, change "a cassette" to --cassette recorder--.

Signed and Sealed this

Twenty-sixth Day of October, 1993

Attest:

BRUCE LEHMAN

*Attesting Officer*   *Commissioner of Patents and Trademarks*